(12) United States Patent
Capt et al.

(10) Patent No.: US 11,132,209 B2
(45) Date of Patent: Sep. 28, 2021

(54) INTEGRATED PROFILE SIMULATION FOR DYNAMIC CONTENT

(75) Inventors: Alexandre Capt, Landser (FR); David Nuescheler, Grellingen (CH)

(73) Assignee: Adobe Inc., San Jose, CA (US)

( * ) Notice: Subject to any disclaimer, the term of this patent is extended or adjusted under 35 U.S.C. 154(b) by 1306 days.

(21) Appl. No.: 13/190,152

(22) Filed: Jul. 25, 2011

(65) Prior Publication Data

US 2014/0068508 A1 Mar. 6, 2014

(51) Int. Cl.
| | | |
|---|---|---|
| *G06F 3/0482* | (2013.01) | |
| *G06F 3/0481* | (2013.01) | |
| *G06F 3/0484* | (2013.01) | |
| *G06F 9/445* | (2018.01) | |
| *G06F 16/958* | (2019.01) | |

(52) U.S. Cl.
CPC .......... *G06F 9/4451* (2013.01); *G06F 16/958* (2019.01)

(58) Field of Classification Search
CPC . G06Q 30/02; G06F 3/0481; G06F 17/30867; G06F 17/3089; H04L 67/02
USPC ......................... 715/808, 768; 726/5; 703/21
See application file for complete search history.

(56) References Cited

U.S. PATENT DOCUMENTS

| | | | | |
|---|---|---|---|---|
| 5,651,107 | A  * | 7/1997  | Frank et al. | 715/768 |
| 7,475,057 | B1 * | 1/2009  | Obradovich | 701/532 |
| 8,464,148 | B1 * | 6/2013  | Wichary | G06F 17/3089 |
| | | | | 715/234 |
| 2002/0069204 | A1* | 6/2002  | Kahn | G06F 17/24 |
| 2003/0120599 | A1* | 6/2003  | Agboatwalla | H04L 41/22 |
| | | | | 705/50 |
| 2003/0149580 | A1* | 8/2003  | Moores et al. | 705/1 |
| 2004/0117460 | A1* | 6/2004  | Walsh et al. | 709/219 |
| 2008/0147661 | A1* | 6/2008  | Carden | G06F 40/106 |
| 2010/0050078 | A1* | 2/2010  | Refuah et al. | 715/706 |
| 2010/0212001 | A1* | 8/2010  | Kashyap et al. | 726/7 |
| 2012/0158539 | A1* | 6/2012  | Lawrence et al. | 705/26.8 |
| 2012/0310751 | A1* | 12/2012 | Kim | 705/14.72 |
| 2016/0202883 | A1* | 7/2016  | Everton | H04L 67/02 |
| | | | | 715/753 |

* cited by examiner

*Primary Examiner* — Jordany Nunez
(74) *Attorney, Agent, or Firm* — Kilpatrick Townsend & Stockton LLP (57) ABSTRACT

Integrated profile simulation techniques for dynamic content are disclosed. In some embodiments, integrated profile simulation for dynamic content includes providing an authoring tool for developing web content that varies based on a user context, and provides for the following: receiving a request to change from a first user profile to a second user profile without requirement for input of user credentials associated with the second user profile, and wherein the currently selected user profile is displayed; dynamically refreshing web content based on the second user profile; and displaying the dynamically refreshed web content.

20 Claims, 10 Drawing Sheets

INTEGRATED PROFILE SIMULATION FOR DYNAMIC CONTENT

BACKGROUND OF THE INVENTION

A web site typically includes a set of interconnected web pages. A web page generally includes content of any of a variety of different types. The content of a web page can also include one or more hyperlinks that provide navigation to other web pages and/or resources. The structure of a web site is generally defined by the hierarchical organization of web pages including the web site as well as the links existing between pages of the web site.

Web site authoring tools and platforms exist. A web authoring tool or platform is generally software to produce web site content. Web site authoring tools and platforms range from simple HyperText Markup Language (HTML) editors to more sophisticated integrated development environments. Increasingly, web site content is produced using various web authoring tools and platforms.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A web site typically includes a set of interconnected web pages. A web page generally includes content of any of a variety of different types. The content of a web page can also include one or more hyperlinks that provide navigation to other web pages and/or resources. The structure of a web site is generally defined by the hierarchical organization of web pages including the web site as well as the links existing between pages of the web site. It is also often desirable to enhance the content and/or structure of a web site, for example, to improve the personalization of the web site or web page based on user context information (e.g., to include a user name in a component of the web page). It is also often desirable to enhance the content and/or structure of a web site, for example, to improve ad placement and/or marketing campaigns for the web site or web page based on user context information. These techniques are often implemented using dynamic web content that can vary based on various user profile information (e.g., a user's name, a user's referral information indicating the web page or web site that referred the user to the current web page or web site, and/or any other user contextual information). These techniques can provide web pages with more relevant information for users.

However, developing web sites and web pages with dynamic web content that can dynamically vary based on a user context presents various new and unique challenges for web developers. In particular, web developers generally need to preview dynamic web content for a variety of different users and different user contexts to ensure that the dynamic web content is appropriately presented for such users and based on such user contexts. For example, a web page that includes a component for displaying the user's name may need to be located and/or formatted differently for different users based on name length and/or language. As another example, a web page that includes a component for displaying a list of the user's friends for social networking may need to be located and/or formatted differently for different users based on their respective number of friends. As yet another example, a web page that includes a component for displaying an advertisement or marketing campaign may need to be tested for various user profiles (e.g., based on demographics associated with the user profile, referral information associated with the user, and/or other information related to the user profile which can include user contextual information).

Thus, web content often needs to be personalized depending on criteria that are based on a user profile of the user currently using or viewing the web site. This profile is contextual and can generally evolve during the user's navigation on the web site (e.g., it can be enhanced with navigation information, such as the monitored user's clickstream and/or referral information). Also, a user can be anonymous when first entering the web site, and then become a registered user during that session with a lot more user context data, and the user can log in as a registered user of the web site or web-based service. However, an author of the authoring platform for developing web content often does not know in advance all of the possible combinations of the personalization criteria and their potential impact on the dynamic web content of the web site. Testing such dynamic web components generally requires having to serially switch user profiles by logging in as another user (e.g., entering the user credentials for that other user), which can be both time consuming and cumbersome and can also require knowledge of such user's credentials. This approach has several limitations: the author needs to know the password of the user he needs to simulate, the author needs to log out/in to view a partial result, and some profile data is difficult or painful to obtain (e.g., clickstream data, such as referral information).

What are needed are techniques for efficiently and effectively facilitating development of dynamic web content that can vary based on a user context. Accordingly, integrated profile simulation techniques for dynamic content (e.g., dynamic web content that can vary based on user context) are disclosed.

In some embodiments, integrated profile simulation for dynamic content includes providing an authoring tool for developing web content that varies based on a user context, and provides for the following: receiving a request to change from a first user profile to a second user profile without a requirement for input of user credentials associated with the second user profile, and in which a currently selected user profile is displayed; dynamically refreshing web content based on the second user profile; and displaying the dynamically refreshed web content. In some embodiments, the currently selected user profile is displayed in a user profile context window. In some embodiments, the web content includes a subset of components of a web page, in which each of the subset of components can change based on the currently selected user profile. In some embodiments, the dynamically refreshing web content based on the second user profile is executed locally on the client device.

In some embodiments, integrated profile simulation for dynamic content further includes generating a pop-up window (e.g., a partially translucent display window and/or overlapping display window that is displayed in parallel with the web content display) that displays user profile information associated with the currently selected user profile.

In some embodiments, integrated profile simulation for dynamic content further includes selecting the dynamic web content (e.g., JavaScript or other dynamic web content), selected based on the currently selected user profile (e.g., executed locally on the client device using the authoring tool and/or web browser executed on the client device), in which the web content is selected from one or more of the following: an advertisement, a marketing campaign, and information associated with the currently selected user profile.

In some embodiments, integrated profile simulation for dynamic content further includes loading a plurality of components (e.g., segmented components) based on the first selected user profile; and refreshing the plurality of components based on the second selected user profile, in which a user context data engine listens for user profile selection changes, and in which the user context data engine refreshes web content based on the currently selected user profile.

In some embodiments, integrated profile simulation for dynamic content further includes: receiving a request to select another user profile, displaying a list of user profiles that can be selected, and receiving a user profile selection; and loading the user profile selection.

In some embodiments, integrated profile simulation for dynamic content further includes simulating a web page that dynamically varies according to a user context based on user profile simulation using an authoring tool executed on the client device.

In some embodiments, integrated profile simulation for dynamic content further includes: receiving input to edit information (e.g., user contextual information) of the currently selected user profile, displaying the edited user profile information (e.g., in a user profile context window), and refreshing the display of the web content based on edited user profile information. For example, if a user's name is edited, then the user's name in the user profile window is updated and any web content showing the user's user name is dynamically updated locally. As another example, if referral information associated with the user profile is edited (e.g., referral information indicating that the user is coming from Yahoo can be edited to indicate that the user is coming from Google), then the user profile window information is updated and any components dependent on such referral information are dynamically updated locally (e.g., providing improved performance and time efficiency). Also, using various techniques described herein can facilitate developing and efficiently testing content that is targeted based on user contextual information, which provides for improved and enhanced targeted content (e.g., targeted dynamic web content).

Figure 1:
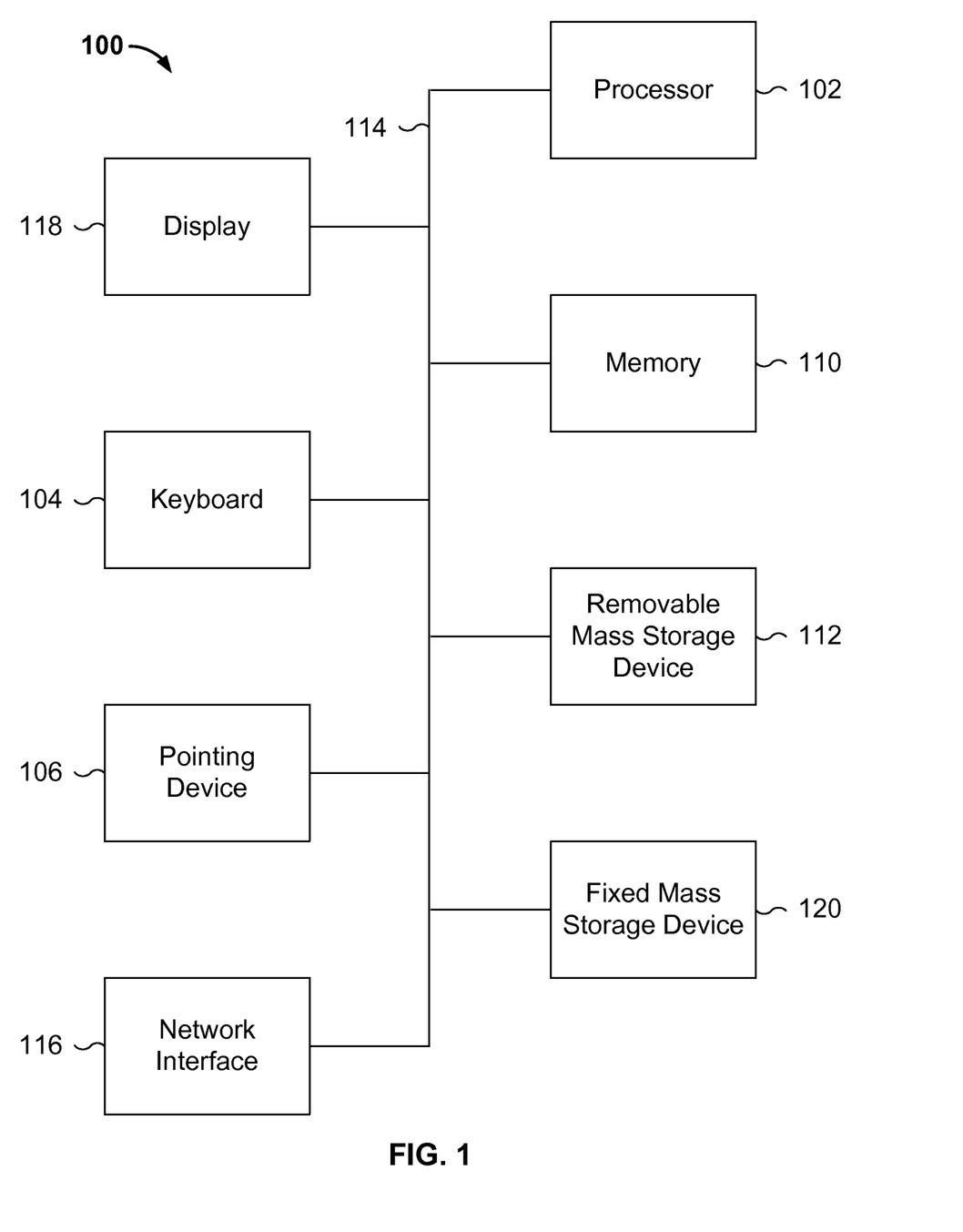
FIG. 1 is a functional diagram illustrating a programmed computer system for providing integrated profile simulation for dynamic content in accordance with some embodiments.

FIG. 1 is a functional diagram illustrating a programmed computer system for providing integrated profile simulation for dynamic content in accordance with some embodiments. As shown, FIG. 1 provides a functional diagram of a general purpose computer system programmed to perform integrated profile simulation for dynamic content in accordance with some embodiments. As will be apparent, other computer system architectures and configurations can be used to perform context-sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various computer/computer implemented functional elements described below with respect to FIGS. 2 through 7 and/or executes/performs the processes described below with respect to FIGS. 8 through 10.

Processor 102 is coupled bidirectionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable non-transitory computer readable storage media, described below, depending on whether, for example, data access needs to be bidirectional or unidirectional. For example, processor 102 can also directly and very rapidly retrieve and store frequently needed data in a cache memory (not shown).

A removable mass storage device 112 provides additional data storage capacity for the computer system 100, and is coupled either bidirectionally (read/write) or unidirectionally (read only) to processor 102. For example, storage 112 can also include computer-readable media such as magnetic tape, flash memory, PC cards, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems, as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection, as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch sensitive displays, transducer card readers, tape readers, voice or handwriting recognizers, biometric readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to: all the media mentioned above, magnetic media such as hard disks, floppy disks, and magnetic tape, optical media such as CD-ROM disks, magneto-optical media such as optical disks, and specially configured hardware devices, such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized (e.g., server devices, appliances with hardware configured for specific functions, such as a web server or an application server, and/or various other types of computing devices that can execute various operating systems and/or virtual machine software techniques).

Figure 2:
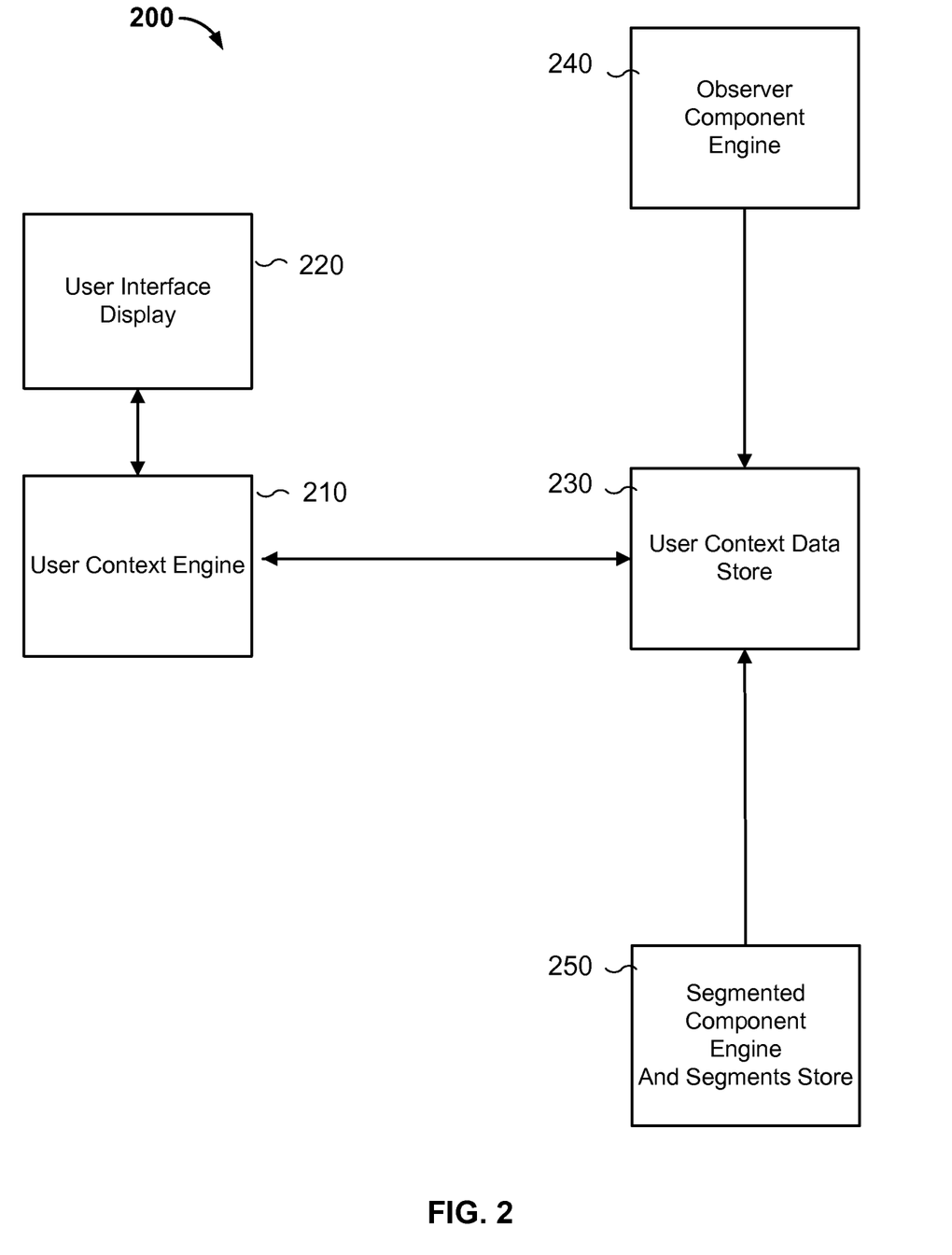
FIG. 2 is a functional diagram illustrating an architecture for providing integrated profile simulation for dynamic content in accordance with some embodiments.

FIG. 2 is a functional diagram illustrating an architecture for providing integrated profile simulation for dynamic content in accordance with some embodiments. As shown, a user context engine 210 is in communication with a user context data store 230. In some embodiments, the user context engine (e.g., executed on a client device) loads the user context data for a currently selected user from the user context data store. In some embodiments, the user context engine displays web content (e.g., dynamic web components that can vary based on user context) using user interface display 220 (e.g., a browser executed on a client device). Observer component engine 240 is in communication with user context data store 230. In some embodiments, the observer component engine includes listening components that monitor for any user profile input changes and/or selections of different user profiles and determines which components should be updated based on current and/or changing or new user context information. As also shown, segmented component engine and segments store 250 are in communication with user context data. In some embodiments, the segmented component engine and segments store 250 stores components and various segment information (e.g., user gender, user age/age range, the geographical location of the user, user's interests, user's purchase information, user's clickstream/navigation related information, and/or other demographic or psychographic information or categorization), and based on user context data for the currently selected user profile, determines components that match segments associated with the user context data for the currently selected user profile. For example, these matching segmented components can then be dynamically updated using the segmented component engine 250 and the user context engine 210 for display on the user interface display 220.

In some embodiments, a plurality of user profiles (e.g., user profiles and associated user contextual information) are loaded into the authoring platform (e.g., authoring system). In some embodiments, user contextual information is captured and stored using various clickstream techniques for monitoring user activities (e.g., while navigating within a web site and/or web page of a web site, and possibly referral information indicating the prior web site that the user visited that referred the user to the current web site, such as a search engine web site, such as Google or Yahoo). In some embodiments, such clickstream techniques for monitoring user activities are client-side persisted (e.g., stored as a local client device browser cookie on the client device or in an HTML 5 data store or using various other techniques). In some embodiments, the authoring platform connects a plurality of components of web content to the user context engine to dynamically update such components as needed. For example, components of web content can dynamically update such components based on a selected user change (e.g., the web developer user or marketing user of the authoring platform can select another user) and/or based on user profile information changes (e.g., the web developer user of the authoring platform can edit various user profile information and/or associated user contextual information). Thus, using the various techniques described herein, the dynamic components of web content are user context-aware (e.g., maintain own user access rights but can dynamically change to different user profiles), which allows, for example, users of the authoring platform to switch user profiles on the fly (e.g., without having to enter user credentials for the selected user, such as without having to logout and log back into site with different user credentials) and see a preview of the dynamic web content. Moreover, the dynamic web content is locally updated using locally executed components, which avoids the delay of having to perform a refresh of the entire web page by requesting a refresh from a remote web server.

In some embodiments, a user of the authoring platform can create segments (e.g., a segment can include a combination of traits or categorizations or other information based on user context information associated with one or more user profiles). For example, a trait can be a characteristic that is determined based on the user context data store (e.g., user's age>23, user's interests include photography, and/or other information). In some embodiments, a segment is resolved if the segment logic applied to the user context matches. In some embodiments, the resolution is implemented as a client-side process (e.g., resolved locally on the client device without having to contact a remote server or remote service) and further, observes user context data storage modifications. In some embodiments, any user context modification causes an automatic update of resolved segments. For example, a segment can be that the user is a potential customer for Adobe® Photoshop® (e.g., user's age>23 and interests include photography).

In some embodiments, the segmented components include logic to resolve which segments to select and dynamically display based on segment matching to currently selected user profile information (e.g., user contextual information associated with the current user). For example, a user of the authoring platform can create a component that displays an advertisement (e.g., a teaser advertisement) for Adobe® Photoshop® if a segment for a potential customer for Adobe® Photoshop® is resolved based on the currently selected user profile data.

In some embodiments, the observer component engine observes user context data store changes (e.g., edits or updates), which can be performed locally on the client device as similarly discussed above. For example, a blog comment component can display an avatar for the currently selected user profile as well as the name of the user. If these properties are updated (e.g., edited by the user of the authoring platform or the user of the authoring platform selects another user profile), then the avatar and the name are automatically and dynamically updated.

Accordingly, using the various techniques described herein, the authoring platform allows users to simulate web content (e.g., including dynamic web content that can vary based on user context) for any potentially relevant user context data for various different user profiles efficiently and effectively. Moreover, these techniques do not require the user of the authoring platform to log in and out using the user credentials of the various users in order to simulate the web content for these various other users.

Figure 3:
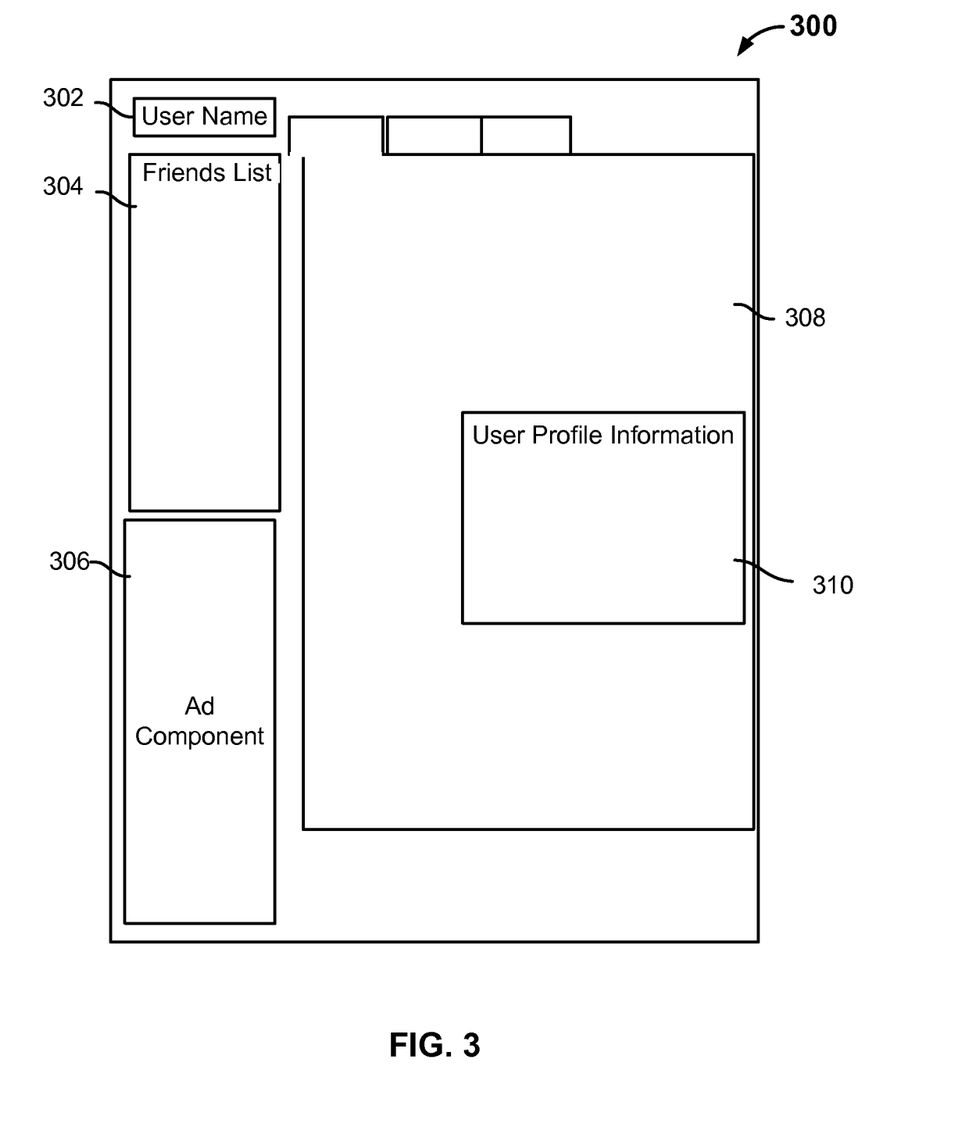
FIG. 3 is a functional diagram illustrating a graphical user interface for providing integrated profile simulation for dynamic content in accordance with some embodiments.

FIG. 3 is a functional diagram illustrating a graphical user interface for providing integrated profile simulation for dynamic content in accordance with some embodiments. As shown, a graphical user interface 300 for web content that includes various dynamic web content is provided, including a user name component 302, a friends list 304, an ad component 306, and various other web content 308 that may or may not include dynamic components. In some embodiments, certain of these dynamic web components can vary based on user contextual information (e.g., user name depends on the current user's name, friends list depends on the current user's friends, and so forth). In some embodiments, certain of the dynamic web components can vary based on segment component matching techniques as described herein (e.g., the ad component as discussed above with respect to various examples). As also shown, a user profile information 310 is provided. In some embodiments, the user profile information includes various data associated with the currently selected user profile (e.g., name, age, geographical information, and/or other information), as well as various user contextual data associated with the currently selected user profile (e.g., referral information, clickstream information, and/or other information).

Figure 4:
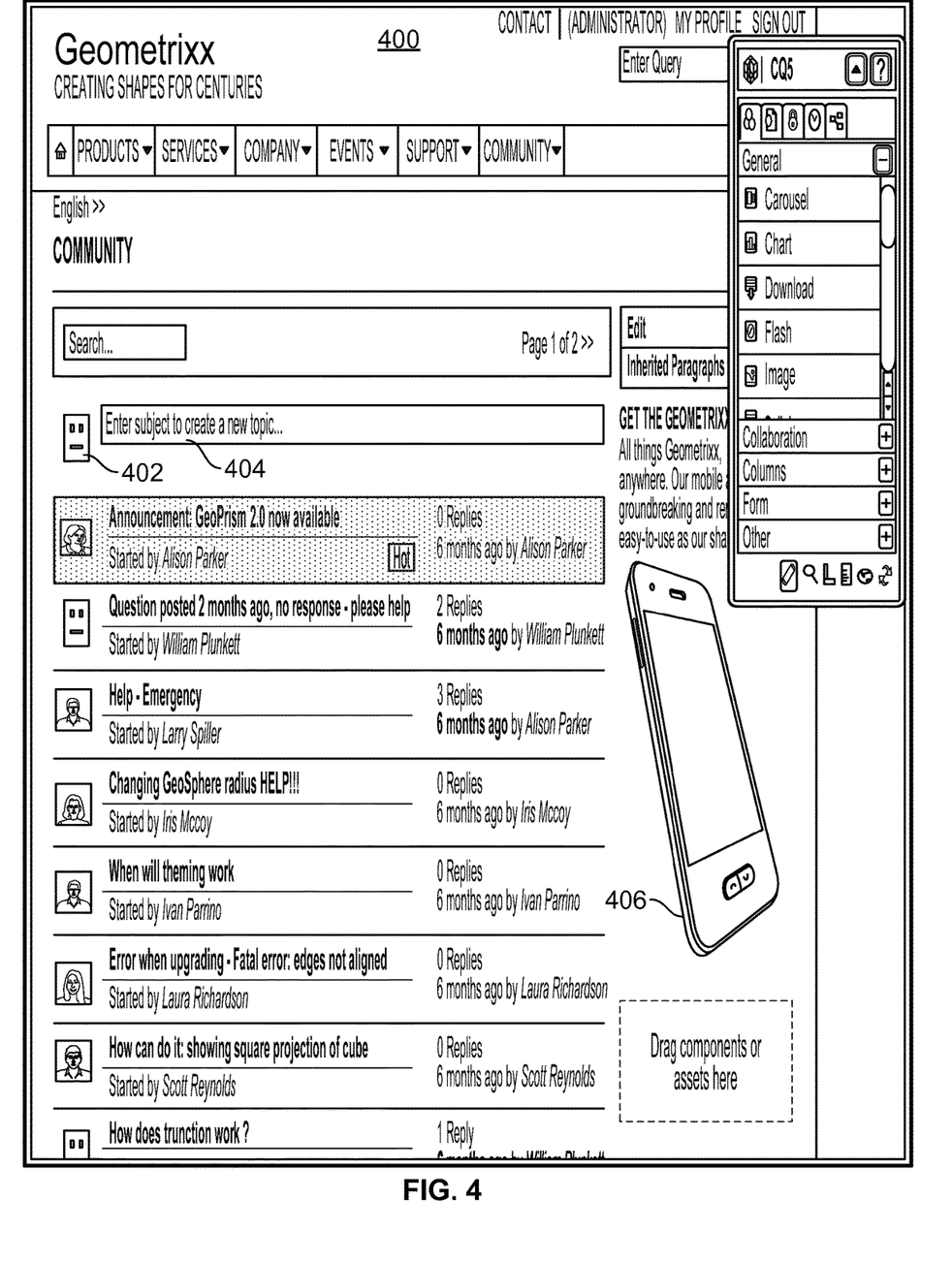
FIG. 4 is a functional diagram illustrating another graphical user interface for providing integrated profile simulation for dynamic content in accordance with some embodiments.

FIG. 4 is a functional diagram illustrating another graphical user interface for providing integrated profile simulation for dynamic content in accordance with some embodiments. As shown, a graphical user interface 400 for web content that includes various dynamic web content is provided, including an avatar for a signed-in user 402, a new topic component 404, and a teaser ad 406. In particular, this example web page is a web blog page that includes three components that can vary based on user profile information. The web blog page can display the user name of the signed-in user, the new topic component can show an avatar associated with the signed-in user, and the teaser ad component can display a teaser based on the user profile data of the signed-in user (e.g., the currently selected user profile).

Figure 5:
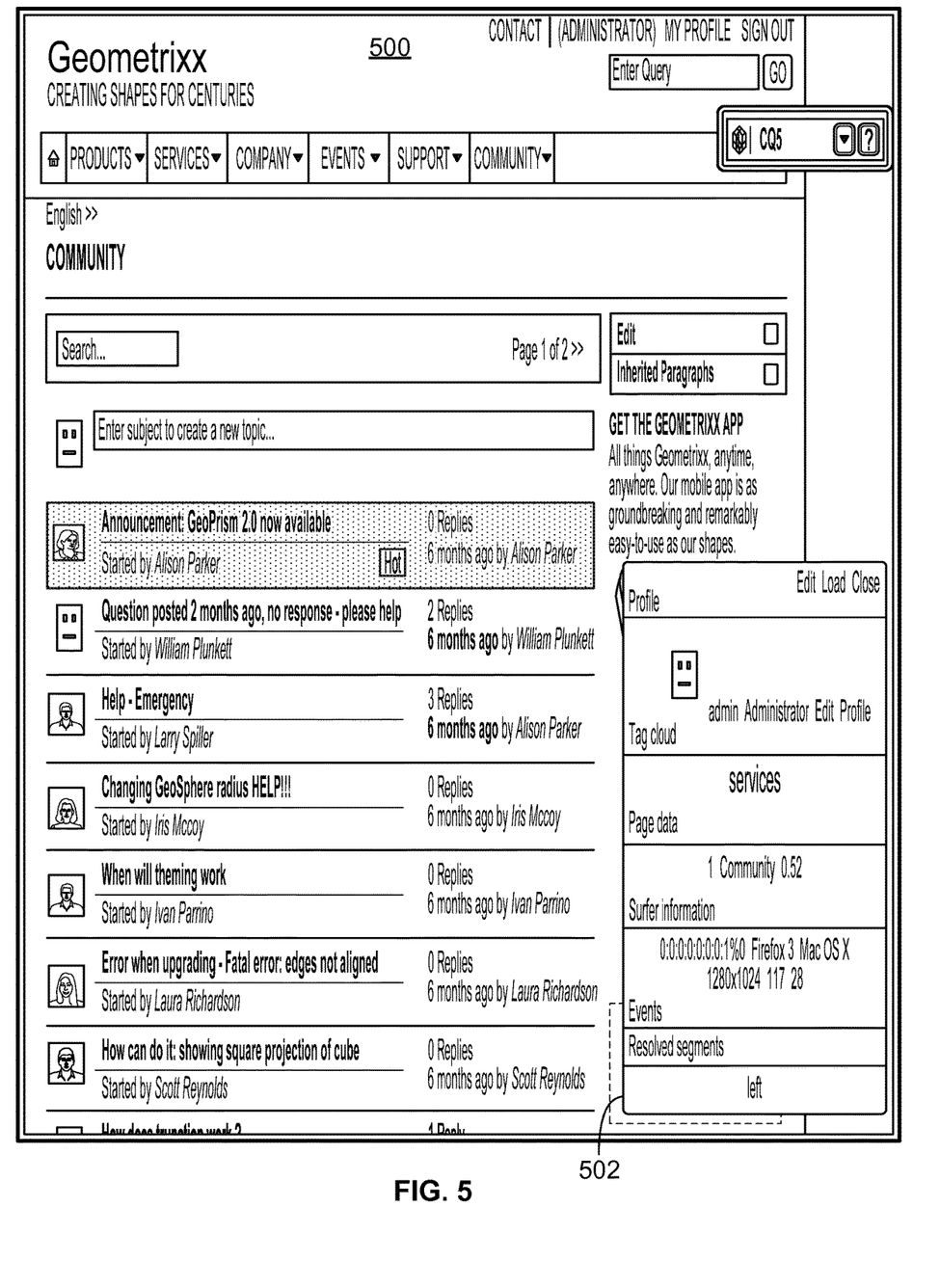
FIG. 5 is a functional diagram illustrating another graphical user interface for providing integrated profile simulation for dynamic content in accordance with some embodiments.

FIG. 5 is a functional diagram illustrating another graphical user interface for providing integrated profile simulation for dynamic content in accordance with some embodiments. As shown, a graphical user interface 500 for web content further includes a user profile display window 502. In particular, the user profile display window can be an overlapping and/or translucent window that partially overlays the web content 500. In some embodiments, the user profile display window 502 displays various user contextual information (e.g., the user contextual information and user profile information stored in the user context data store for the currently selected user profile), as discussed above with respect to various embodiments.

Figure 6:
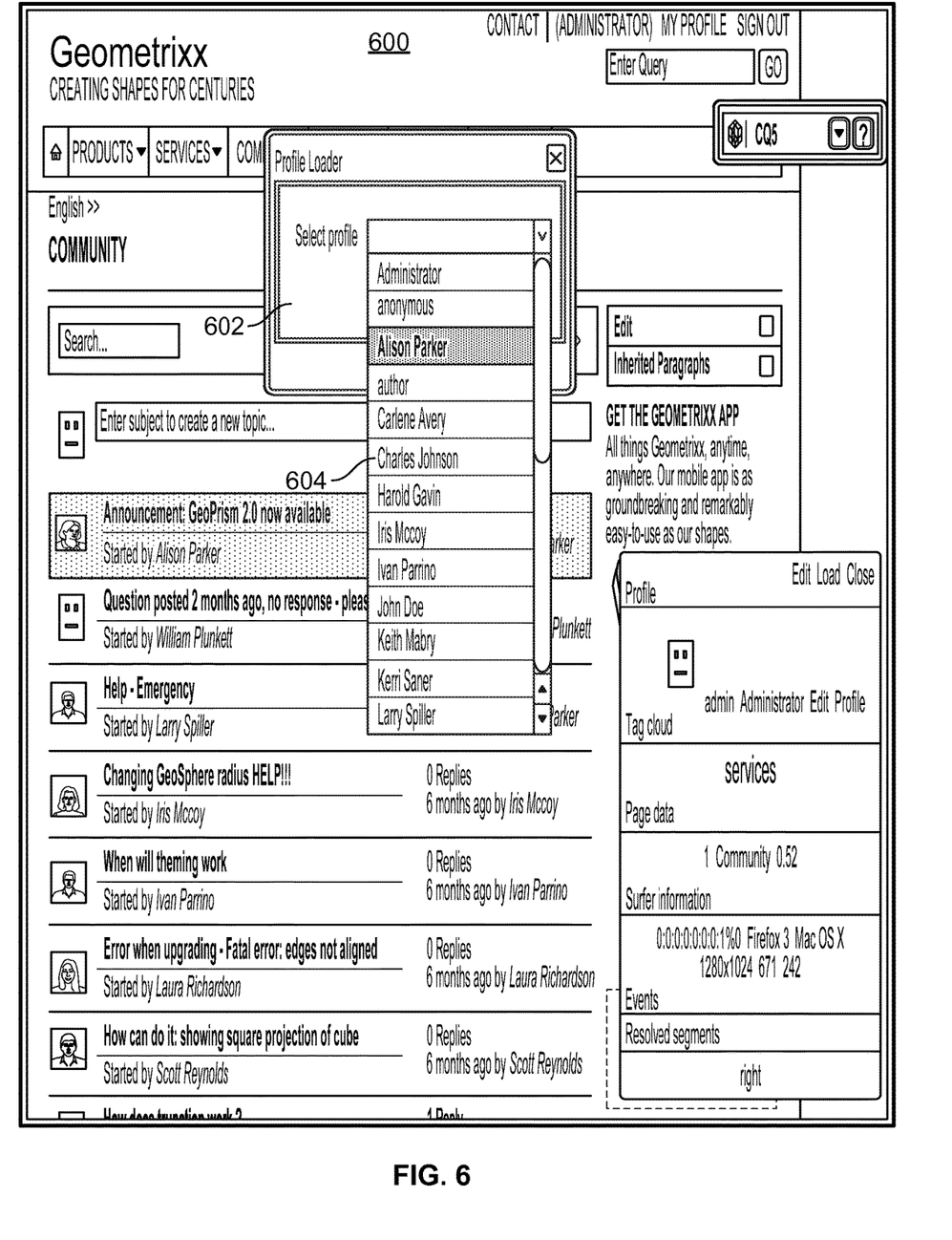
FIG. 6 is a functional diagram illustrating another graphical user interface for providing integrated profile simulation for dynamic content in accordance with some embodiments.

FIG. 6 is a functional diagram illustrating another graphical user interface for providing integrated profile simulation for dynamic content in accordance with some embodiments. As shown, a graphical user interface 600 for web content further includes a user profile loader selection window 602, which can display a list of available user profiles for selection using user profile selection menu 604. In particular, a user of the authoring platform can select another user profile to load, which will then automatically load different user context data in the user context data store.

Figure 7:
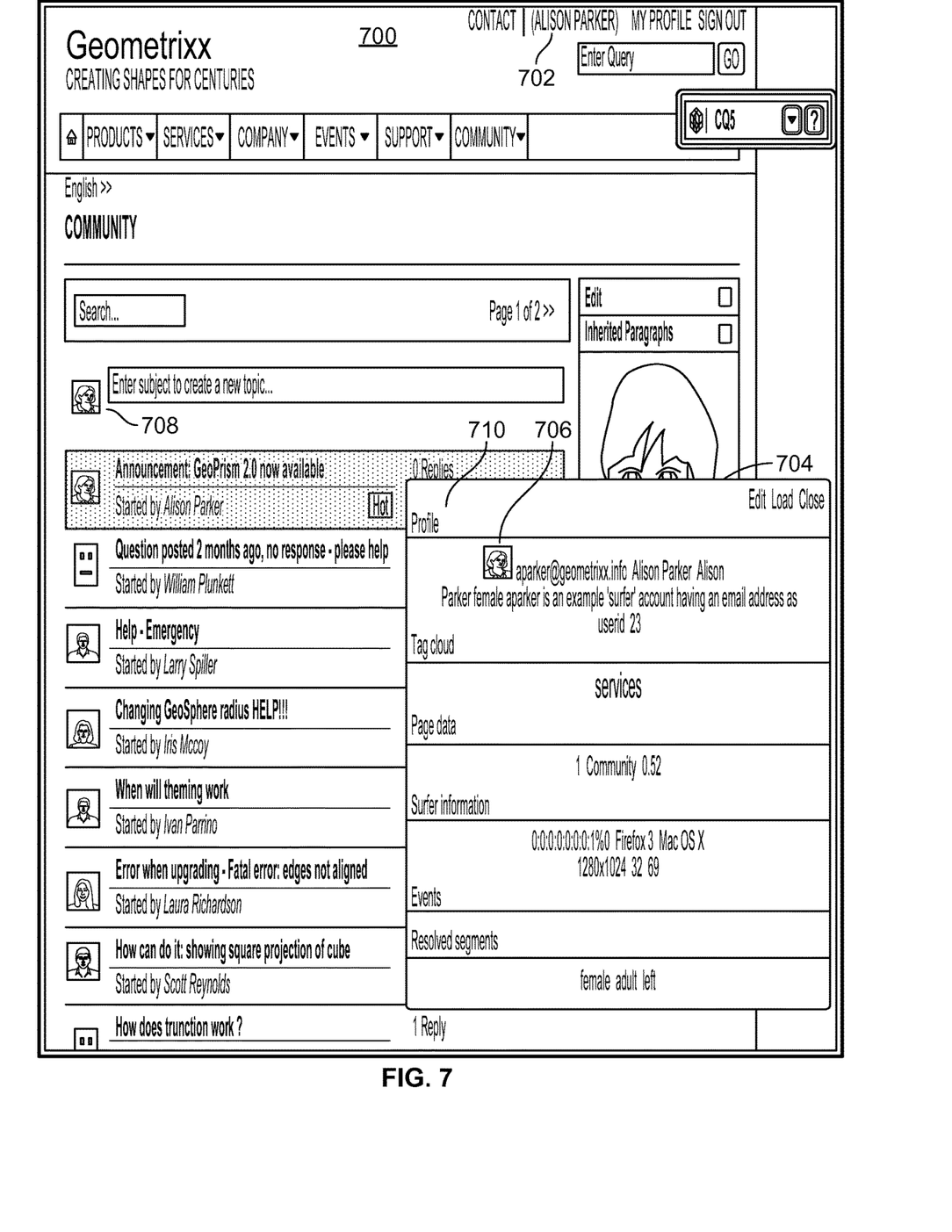
FIG. 7 is a functional diagram illustrating another graphical user interface for providing integrated profile simulation for dynamic content in accordance with some embodiments.

FIG. 7 is a functional diagram illustrating another graphical user interface for providing integrated profile simulation for dynamic content in accordance with some embodiments. As shown, a graphical user interface 700 for web content further includes various dynamic web components, such as a display name (e.g., "Alison Parker") 702 and an avatar (e.g., the avatar selected by the user, "Alison Parker") 708. As also shown, the user profile information that is used to generate these dynamic web components is displayed in the user profile information display 710, which displays the currently selected user's name 704 and avatar 706.

In some embodiments, the dynamic web components are refreshed or updated locally based on user context data changes or updates, without requiring a page reload from a remote web site or web service. In some embodiments, selections of different user profiles is permitted for a user of the authoring platform for any user profile for which the user has profile read access rights (e.g., without requiring the user to enter the user credentials for each such user profile when switching between such user profiles to perform integrated profile simulation for various of such user profiles). In some embodiments, the user of the authoring platform can retain the user's own user rights (e.g., administrator read/write access rights) while performing integrated profile simulation for dynamic content using the various techniques described herein.

Figure 8:
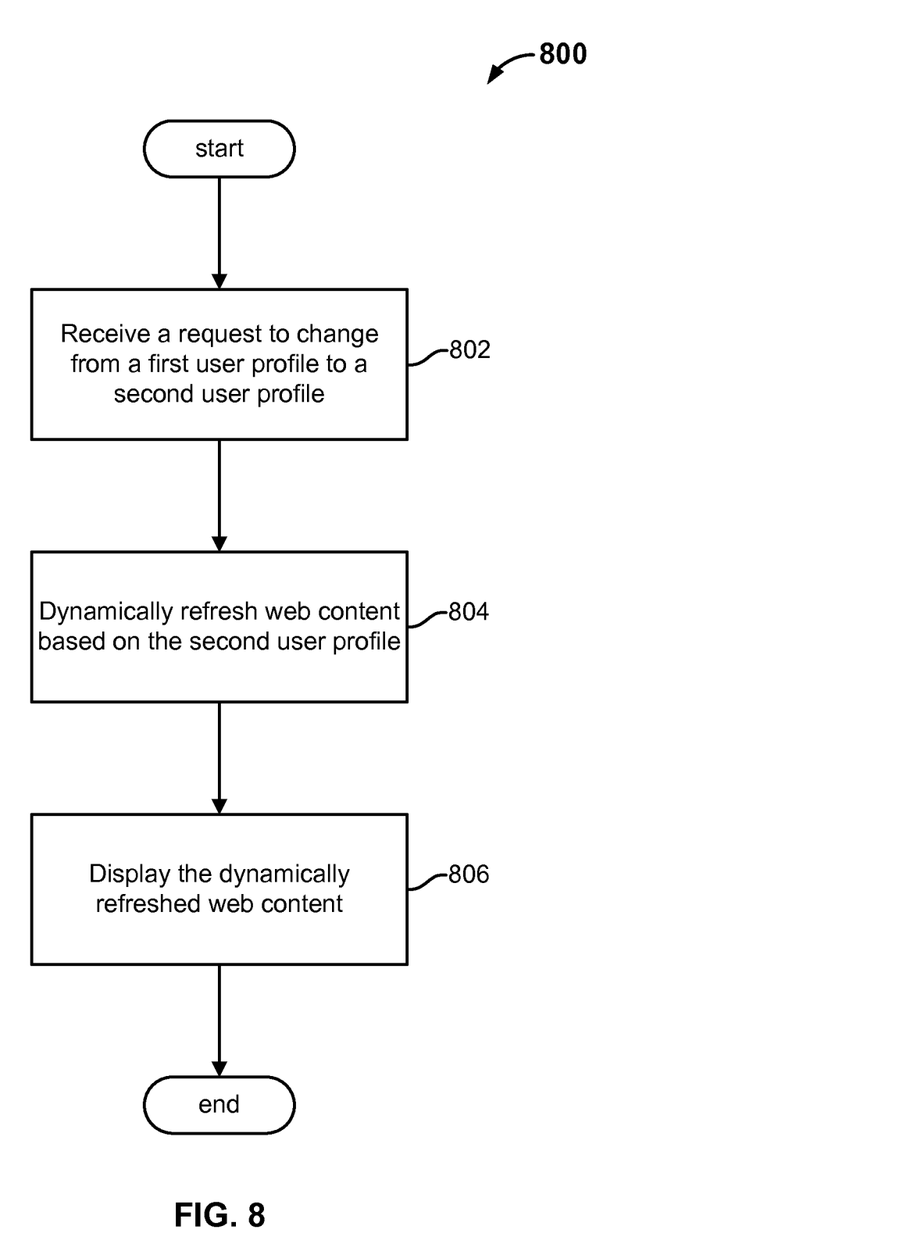
FIG. 8 is a flow diagram for integrated profile simulation for dynamic content in accordance with some embodiments.

FIG. 8 is a flow diagram for integrated profile simulation for dynamic content in accordance with some embodiments. At 802, a request to change from a first user profile to a second user profile is received (e.g., without requirement for input of user credentials associated with the second user profile). At 804, dynamically refreshing web content based on the second user profile is performed. At 806, displaying the dynamically refreshed web content is performed.

Figure 9:
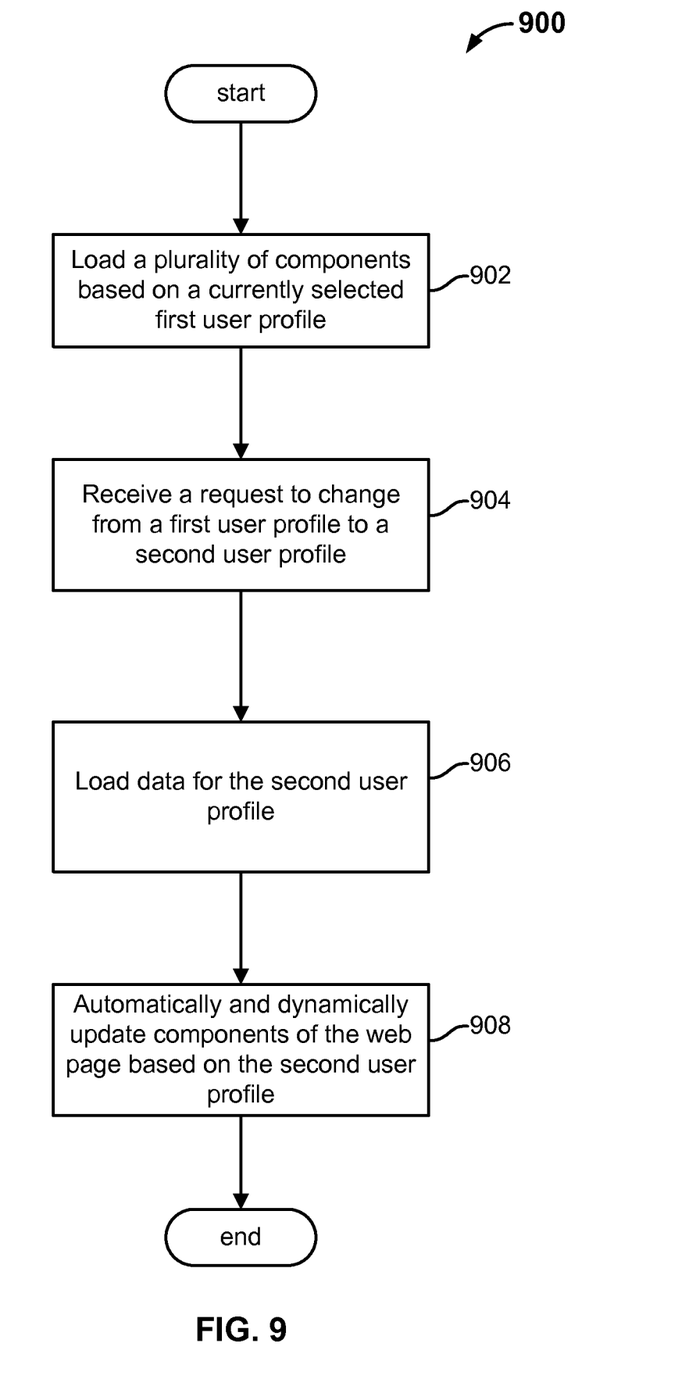
FIG. 9 is a flow diagram for integrated profile simulation for dynamic content in accordance with some embodiments.

FIG. 9 is a flow diagram for integrated profile simulation for dynamic content in accordance with some embodiments. At 902, loading a plurality of components based on a currently selected first user profile is performed. At 904, a request to change from a first user profile to a second user profile is received. At 906, loading data for the second user profile is performed (e.g., for display in a user profile information display window). In some embodiments, segmented components are determined based on the user contextual information associated with the selected second user profile. In some embodiments, components that vary based on user contextual information listen for user profile changes and determine whether or not to automatically update themselves. At 908, automatically and dynamically updating components of the web page based on the second user profile is performed.

Figure 10:
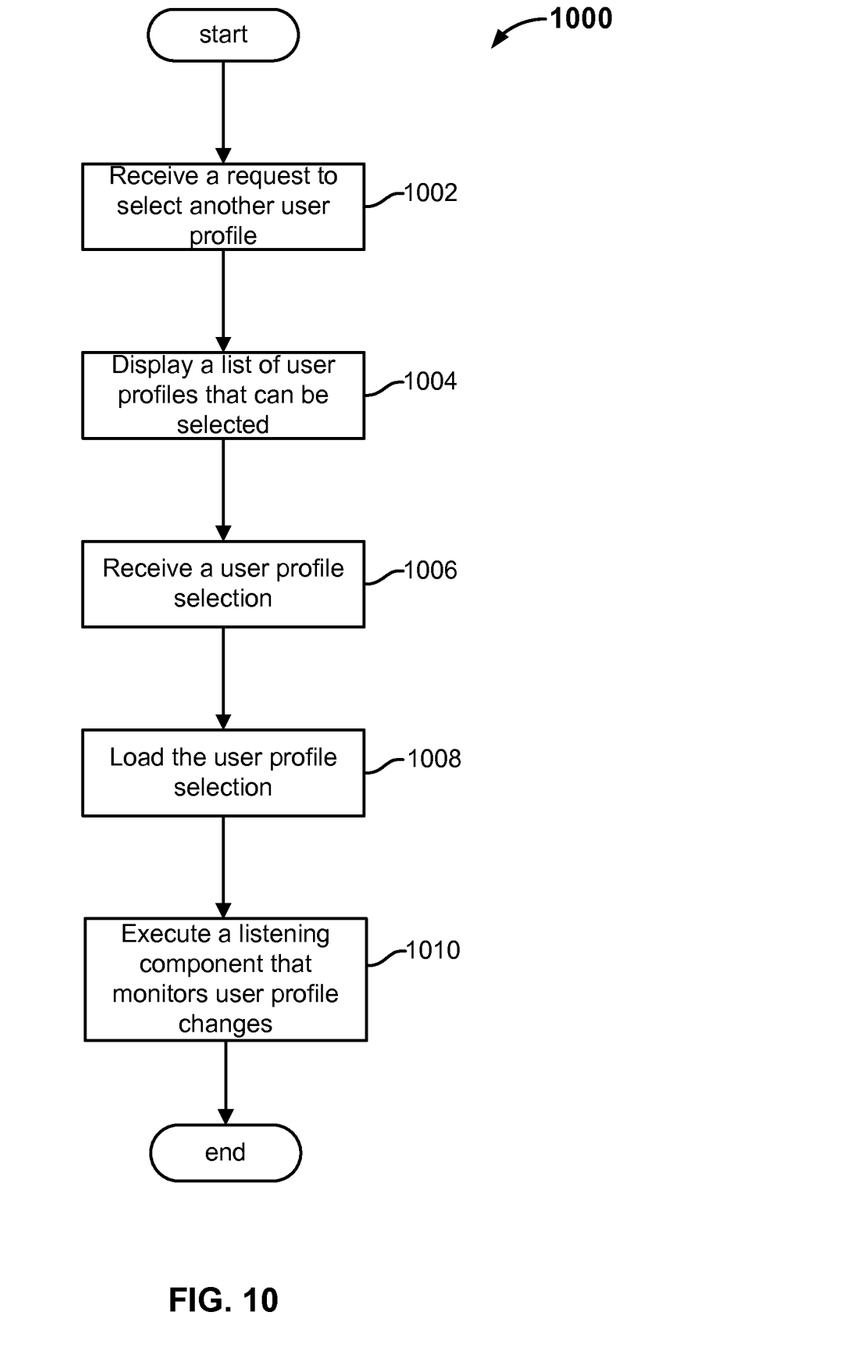
FIG. 10 is a flow diagram for integrated profile simulation for dynamic content in accordance with some embodiments.

FIG. 10 is a flow diagram for integrated profile simulation for dynamic content in accordance with some embodiments. At 1002, a request to select another user profile is received. At 1004, displaying a list of user profiles that can be selected is performed. At 1006, a user profile selection is received. At 1008, loading of the user profile selection is performed. At 1010, a listening component that monitors user profile changes is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a client device comprising a processor and a memory having instructions stored thereon which, when executed by the processor, cause the client device to perform operations comprising:
receiving, from a segmented component engine, multiple segmented components stored in a segment store, wherein the segmented component engine is configured to determine that each of the stored multiple segmented components matches a segment stored in the segment store, the segment including a combination of traits associated with a currently selected user profile;
displaying the multiple segmented components and a user profile window including an indication of the currently selected user profile, the user profile window configured to receive inputs to edit profile attributes of the currently selected user profile;
receiving a request to change the currently selected user profile from a first user profile to a second user profile, wherein the request does not include user credentials associated with the first or second user profiles;
in response to the request, changing the currently selected user profile to the second user profile without requiring input of user credentials associated with the first or second user profiles;
receiving, from an observer component engine configured to monitor for the change from the first user profile to the second user profile, an indication of a given segmented component of the multiple segmented components, wherein the observer component engine is further configured to determine that the given segmented component is to be updated based on the change from the first user profile to the second user profile;
dynamically refreshing the given segmented component based on the second user profile;
displaying the dynamically refreshed given segmented component and the user profile window; and
in response to receiving an input in the user profile window to edit a profile attribute for the currently selected user profile, repeating the refreshing.

2. The system recited in claim 1, wherein the client device executes an authoring tool configured to develop web content that varies based on a user context.

3. The system recited in claim 1, wherein the given segmented component includes a subset of components of a web page.

4. The system recited in claim 1, wherein the given segmented component includes a subset of components of a web page, and wherein each of the subset of components can change based on the currently selected user profile.

5. The system recited in claim 1, wherein the dynamically refreshing:
refreshes web content based on the second user profile; and
is executed locally on the client device.

6. The system recited in claim 1, wherein the displaying comprises:
generating the user profile window as a pop-up window that displays editable user profile attributes for the currently selected user profile.

7. The system recited in claim 1, wherein the displaying comprises:
generating the user profile window as a pop-up window displaying editable user profile attributes for the currently selected user profile, wherein the pop-up window is a partially translucent display window that is displayed in parallel with a web content display.

8. The system recited in claim 1, wherein the displaying comprises:
generating the user profile window as a pop-up window displaying editable user profile attributes for the currently selected user profile, wherein the pop-up window is a partially translucent and overlapping display window that is displayed in parallel with a web content display and partially overlaps the web content display.

9. The system recited in claim 1, the operations further comprising:
selecting the given segmented component based on the currently selected user profile, wherein the given segmented component is selected from one or more of the following: an advertisement, a marketing campaign, and information associated with the currently selected user profile.

10. The system recited in claim 1, wherein the client device locally executes dynamic web content code to determine a plurality of web content components to display based on the currently selected user profile.

11. The system recited in claim 1, the operations further comprising:
loading a plurality of components based on the first selected user profile; and
refreshing the plurality of components based on the second selected user profile, wherein a user context data engine listens for user profile selection changes, and wherein a user context data engine refreshes web content based on the currently selected user profile.

12. The system recited in claim 1, the operations further comprising:
receiving a request to select another user profile;
displaying a list of user profiles that can be selected;
receiving a user profile selection; and
loading the user profile selection.

13. The system recited in claim 1, the operations further comprising:
receiving input to edit information of the currently selected user profile; and
refreshing the display of the given segmented component based on edited user profile information.

14. The system recited in claim 1, the operations further comprising:
receiving input to edit information of the currently selected user profile; and
displaying the edited user profile information.

15. The system recited in claim 1, the operations further comprising:
receiving an input in the user profile window to navigate to and edit a profile attribute of the currently selected user profile;
displaying the edited user profile attribute; and
refreshing a display of web content based on the edited user profile attribute.

16. The system recited in claim 1, the operations further comprising:
receiving an input in the user profile window to edit user contextual information of the currently selected user profile;
displaying the edited user profile contextual information in a user profile context window; and
refreshing the display of the given segmented component based on the edited user contextual information.

17. A method, in which one or more computing devices perform operations, the operations comprising:
receiving, from a segmented component engine, multiple segmented components stored in a segment store, wherein the segmented component engine is configured to determine that each of the stored multiple segmented components matches a segment stored in the segment store, the segment including a combination of traits associated with a currently selected user profile;
displaying the multiple segmented components and a user profile window including an indication of the currently selected user profile, the user profile window configured to receive inputs to edit profile attributes of the currently selected user profile;
receiving a request to change the currently selected user profile from a first user profile to a second user profile, wherein the request does not include user credentials associated with the first or second user profiles;
in response to the request, changing the currently selected user profile to the second user profile without requiring input of user credentials associated with the first or second user profiles;
receiving, from an observer component engine configured to monitor for the change from the first user profile to the second user profile, an indication of a given segmented component of the multiple segmented components, wherein the observer component engine is further configured to determine that the given segmented component is to be updated based on the change from the first user profile to the second user profile;
dynamically refreshing the given segmented component based on the second user profile;
displaying the dynamically refreshed given segmented component and the user profile window; and
in response to receiving an input in the user profile window to edit a profile attribute for the currently selected user profile, repeating the refreshing.

18. A non-transitory computer readable storage medium having instructions stored thereon which, when executed by a computing device, cause the computing device to perform operations comprising:
receiving, from a segmented component engine, multiple segmented components stored in a segment store, wherein the segmented component engine is configured to determine that each of the stored multiple segmented components matches a segment stored in the segment store, the segment including a combination of traits associated with a currently selected user profile;
displaying the multiple segmented components and a user profile window including an indication of the currently selected user profile, the user profile window configured to receive inputs to edit profile attributes of the currently selected user profile;

receiving a request to change the currently selected user profile from a first user profile to a second user profile, wherein the request does not include user credentials associated with the first or second user profiles;

in response to the request, changing the currently selected user profile to the second user profile without requiring input of user credentials associated with the first or second user profiles;

receiving, from an observer component engine configured to monitor for the change from the first user profile to the second user profile, an indication of a given segmented component of the multiple segmented components, wherein the observer component engine is further configured to determine that the given segmented component is to be updated based on the change from the first user profile to the second user profile;

dynamically refreshing the given segmented component based on the second user profile;

displaying the dynamically refreshed given segmented component and the user profile window; and in response to receiving an input in the user profile window to edit a profile attribute for the currently selected user profile, repeating the refreshing.

19. The system recited in claim 1, wherein:

the combination of traits included in the stored segment are based on user context information stored by a user context engine that is configured to load user context data based on the currently selected user profile, and the dynamically refreshing the given segmented component based on the second user profile comprises receiving, from the user context engine, an updated segmented component associated with additional user context data for the second user profile.

20. The system recited in claim 1, wherein:

each of the multiple segmented components includes segment logic capable of resolution based on the currently selected user profile, and determining that each of the multiple segmented components matches the stored segment comprises applying the segment logic of each of the multiple segmented components to the combination of traits included in the stored segment.

* * * * *